Patented July 20, 1948

2,445,637

UNITED STATES PATENT OFFICE 2,445,637

COATING COMPOSITION COMPRISING A DRYING OIL, A RESIN, AND AN ACYCLIC TERPENE SOLVENT

Alfred L. Rummelsburg, Wilmington, Del., assignor to Hercules Powder Company, Wilmington, Del., a corporation of Delaware No Drawing. Application December 23, 1944, Serial No. 569,622

12 Claims. (Cl. 260—19)

This invention relates to protective coating compositions containing an oleaginous film-forming ingredient; more particularly, it relates to improved solvents and solvent compositions for protective coatings containing an oleaginous film-forming ingredient.

Paints, varnishes, and enamels may be categorized as protective coatings containing an oleaginous film-forming ingredient since they are characterized by the fact that a drying oil is employed at some step in their manufacture. It has been the practice, heretofore, of employing as a solvent for the film-forming ingredients, turpentine, or one of the various petroleum fractions, such as mineral spirits, petroleum naphtha, benzine, etc. In some instances, solvents containing aromatic constituents, such as benzene, solvent naphtha, etc., have been utilized for their peculiar solvency characteristics.

Now, in accordance with this invention, it has been found that coating compositions containing a drying oil as one of the film-forming ingredients may be considerably improved by utilizing a solvent containing at least about 10% of an acyclic terpene as the solvent for the drying oil and any other film-forming ingredients present. More particularly, it has been found that the inclusion of such an acyclic terpene as the solvent or as a constituent of the solvent in oleaginous coating compositions provides coating compositions of greatly improved drying characteristics. Such compositions dry dust free and tack free in much less time than do compositions containing turpentine or the petroleum solvents heretofore employed. This result is unexpected from the standpoint of the comparative boiling points of the acyclic terpenes and the compared solvents. Due to their high solvency power, the acyclic terpenes provide coating compositions which are substantially free from skin formation. Films formed from coating compositions containing an acyclic terpene as a solvent are harder and show less tendency to yellow than those of the prior art. Furthermore, coatings prepared from these novel compositions possess better resistance to ultraviolet light and consequently better durability than many of the compositions heretofore available.

In accordance with the present invention, varnishes may be prepared by heating together a drying oil and a gum or resin and thereafter adding an acyclic terpene as a solvent. Various pigments may be ground into the varnishes to yield enamels. Or, if desired, drying oils may be heat-bodied and thinned with an acyclic terpene solvent to make grinding liquids for interior paints. The acyclic terpene solvents may also be employed in combination with various drying oils and pigments as exterior paints. It will be understood that the acyclic terpene, for example, allo-ocimene, may be used as the sole solvent in the composition, or if desired, it may constitute but 10% of the ingredients in the total solvent employed in the coating composition. The following examples will illustrate certain specific embodiments of the invention. They are, however, not to be taken as limiting the invention but merely as being illustrative. All parts and percentages in the specification are by weight unless otherwise indicated.

Example 1

Fifty gallon ester gum varnishes were prepared using the following raw material formulation:

| | Parts |
|---|---|
| Ester gum | 82 |
| China-wood oil | 232 |
| Perilla oil | 27 |
| Linseed oil (2-hour bodied) | 6 |
| Litharge | 1.6 |
| Manganese acetate | 1 |
| Cobalt acetate | 0.5 |
| Solvent | 418 |

The China-wood oil, perilla oil, and ester gum were heated to 400° F. The litharge was added and the temperature raised to 580 to 590° F. The varnish base was then removed from the fire and held for a 6-inch string. After checking with bodied linseed oil and cooling to 441° F., the solvent was added.

In this manner, three separate varnishes containing (1) a terpene mixture obtained by the pyrolysis of alpha-pinene and containing 40% allo-ocimene, (2) steam-distilled wood turpentine, and (3) mineral spirits having a distillation range of from 300° F. to 410° F., respectively, as solvents were prepared. These varnishes were flowed on glass and their drying times compared with results as indicated in the following tabulation:

| Composition | Drying Time, Tack Free |
|---|---|
| | Hours |
| Allo-ocimene thinned varnish | 2.0 |
| Turpentine thinned varnish | 6.0 |
| Mineral spirit thinned varnish | 6.0 |

Comparative tests showed that varnish films prepared from the allo-ocimene containing varnishes were harder than those prepared from the mineral spirit and turpentine-containing varnish. Furthermore, when films of the varnishes thinned with allo-ocimene and turpentine, respectively, were spread on aluminum foil and then dried for 4 hours at 100° C., the films from the allo-ocimene containing varnishes left from 3% to 8% more total solids. When the varnishes made as outlined above were subjected to the photochemical embrittlement test of P. Walker as described by H. Gardener in "Paints, Oils, Lacquers and Colors," 9th edition (1939), at page 182, the films resulting from the allo-ocimene containing varnishes showed greater resistance to ultraviolet rays. These films also possess better durability.

*Example 2*

Thirty-three gallon ester gum varnishes were prepared using the following raw material formulation:

| | Parts |
|---|---|
| Ester gum | 724 |
| China-wood oil | 1060 |
| Perilla oil | 120 |
| Linseed oil (2-hour bodied) | 295 |
| Litharge | 18.6 |
| Manganese resinate | 11 |
| Cobalt acetate | 15.9 |
| Solvent | |

The China-wood oil, perilla oil, and ester gum were heated to 400° F. The litharge was added and the temperature raised to 580 to 590° F. The varnish base was then removed from the fire and held for a 6-inch string. After checking with bodied linseed oil and cooling to 441° F., the cobalt and manganese driers were added. To this base, an equal amount by weight of a solvent consisting of a terpene mixture and containing 40% allo-ocimene was added to provide a thinned varnish. For comparison, two additional varnishes were prepared in the same manner but were thinned with (1) steam-distilled wood turpentine, and (2) mineral spirits having a distillation range from 300° F. to 410° F., respectively, as the solvents in place of the allo-ocimene. These varnishes were flowed on glass plates and the drying times compared with results as indicated in the following tabulation:

| Composition | Drying Time | |
|---|---|---|
| | Dust Free | Tack Free |
| | *Hours* | *Hours* |
| Allo-ocimene thinned varnish | 0.5 | 2.0 |
| Turpentine thinned varnish | 1.25 | 2.75 |
| Mineral spirit thinned varnish | 1.0 | 2.25 |

*Example 3*

Thirty-three gallon phenolic resin varnishes were prepared using the following raw material formulation:

| | Parts |
|---|---|
| p-Phenyl phenol-formaldehyde resin | 710 |
| China-wood oil | 1700 |
| Heavy bodied linseed oil | 170 |
| Solvent | |

The p-phenyl phenol-formaldehyde resin (Bakelite resin No. 254) and China-wood oil were heated to 465 to 470° F. and held at this temperature for a 12-inch string. The reaction mass was then checked with the heavy bodied linseed oil and then cooled to 400° F. The varnish base so prepared was thinned at 400° F. with an equal amount by weight of a terpene mixture obtained by the pyrolysis of alpha-pinene and containing 40% allo-ocimene. In this same manner two additional varnishes containing as solvents (1) steam-distilled wood turpentine, and (2) 80% mineral spirits having a distillation range of 300° F. to 410° F. in conjunction with 20% dipentene were prepared. Metallic driers were added in the form of naphthenate salts to each of the resulting varnishes to give 0.5% lead as metal and 0.03% cobalt as metal based on the oil content.

The varnishes prepared in accordance with the above method were tested for skinning characteristics upon standing. The allo-ocimene containing varnishes were shown to be free from skin formation after having stood for a period of 30 days, whereas the other varnishes had skinned badly. Films prepared from the allo-ocimene containing varnish showed that less yellowing had taken place in drying; also the dried films from the allo-ocimene containing varnishes were definitely harder than films resulting from the turpentine and mineral spirit thinned varnishes. The allo-ocimene thinned varnishes had a faster drying rate as indicated in the following tabulation:

| Composition | Drying Time | |
|---|---|---|
| | Dust Free | Tack Free |
| | *Hours* | *Hours* |
| Allo-ocimene thinned varnish | 0.5 | 1.5 |
| Turpentine thinned varnish | 0.5 | 2.5 |
| Mineral spirit thinned varnish | 0.7 | 2.5 |

*Example 4*

Three flat wall paints were prepared using the following flat wall grinding oils formula:

| | Parts |
|---|---|
| Heat-bodied linseed oil | 400 |
| Heat-bodied perilla oil | 200 |
| Heat bodied soybean oil | 200 |
| Solvent | 1200 |

A mixture of the above bodied oils was heated to 575 to 580° F., held for 15 minutes at this temperature and then cooled to 440° F. The solvent was then added and sufficient liquid lead and cobalt drier in the form of their naphthenates was added such that there was present 0.5% lead as metal and 0.08% cobalt as metal on the basis of the oil.

Utilizing the above formula three separate paint oils were prepared, (1) in which the solvent was a terpene mixture obtained by the pyrolysis of alpha-pinene and containing 40% allo-ocimene, (2) in which the solvent was turpentine, and (3) in which the solvent was mineral spirits having a distillation range of 300° F. to 410° F. Three paints were then made by mixing 350 parts of the respective paint oils with 650 parts of lithopone and grinding in a ball mill. The resulting paints were brushed on aluminum panels. Films from the allo-ocimene containing paint showed definitely superior water resistance, leveling characteristics, and were much harder.

*Example 5*

A varnish base was prepared by heating 200 parts of heat-reactive p-phenyl phenol formaldehyde resin (Bakelite No. 254) and 468 parts of China-wood oil to 465° F. over a period of 35 minutes. Heating was continued for 10 minutes until a 12-inch string was obtained. The mixture was removed from the heat and chilled by the addition of 48 parts of heat-bodied linseed oil. The resulting varnish was thinned with an equal weight of pure myrcene. In this manner two additional varnishes were prepared utilizing as solvents (1) a terpene mixture obtained by the pyrolysis of beta-pinene and containing 30% myrcene, and (2) steam-distilled wood turpentine. To each varnish were added 0.5% lead and 0.03% cobalt in the form of their naphthenates, based on the oil content of the varnish. The varnishes were sprayed on panels and dried in an atmosphere having a temperature of 75° F. and a humidity 58%. The results are given in the following tabulation:

| Composition | Drying Time | | |
|---|---|---|---|
| | Initial Set | Set to Dust | Initial Touch |
| Varnish containing 100% myrcene as solvent. | 40 mins. | 53 mins. | 1 hr. 30 mins. |
| Varnish containing 30% myrcene as solvent. | 50 mins. | 1 hr. 15 mins. | 2 hrs. |
| Wood turpentine | 50 mins. | 1 hr. 25 mins. | 2 hrs. 25 mins. |

*Example 6*

An exterior house paint was prepared utilizing the following raw material formulation:

| | Parts |
|---|---|
| Basic lead carbonate | 1044 |
| Raw linseed oil | 219 |
| 40% allo-ocimene (pyrolyzed alpha-pinene) | 117 |
| Liquid drier (consisting of 0.054 part of cobalt and 0.54 part of lead in the form of their naphthenates dissolved in mineral spirits) | 10 |

The above ingredients were mixed until a homogeneous composition resulted. It was brushed on panels and was found to have excellent durability. In general, the characteristics of the composition were the same as those previously mentioned.

*Example 7*

An enamel was prepared using the following raw material formulation:

| | Parts |
|---|---|
| Ester gum | 205 |
| China-wood oil | 580 |
| Perilla oil | 70 |
| Litharge | 4 |
| Bodied linseed oil | 155 |
| 40% allo-ocimene (pyrolyzed alpha-pinene) | 1045 |

The perilla oil, China-wood oil, and ester gum were heated to 400° F. The litharge was then added and the temperature raised to 580° F. for a short string. The bodied linseed oil was added and after cooling the mixture to 440° F., the allo-ocimene was added. An enamel was then prepared by adding 2 pounds of lithopone per gallon of the varnish and the mixture ground on a roller mill. When this enamel was brushed on a panel, it exhibited excellent flowout. The characteristics of the enamel were generally similar to those mentioned in connection with the previous examples.

*Example 8*

An enamel was prepared using the following raw material formulation:

| | Parts |
|---|---|
| Resin | 800 |
| China-wood oil | 68 |
| Solvent | 732 |
| Toluidine red pigment | 160 |
| Lead naphthenate | 6.7 |
| Cobalt naphthenate | 6.7 |

The resin, containing 50% of the glyceride of a terpenemaleic anhydride condensate and 50% linseed oil fatty acid glyceride, was heated with the China-wood oil to 550° F. in 40 minutes under an atmosphere of nitrogen. After cooling to 465° F., the mass was thinned to 50° nonvolatile matter with a solvent consisting of 5% dipentene, 30% mineral spirits, and 65% naphtha. This vehicle was then ground with the pigment in a pebble mill for 75 hours. The lead and cobalt naphthenates were added, and the enamel was ground for an additional 1½ hours.

One hundred parts of this enamel were further diluted to attain 45% nonvolatiles with the above mixed solvent and/or allo-ocimene (93%) and the drying rate was determined. A comparison of the data obtained on each of the samples is given in the following table:

| Parts of Above Mixed solvent | Parts Allo-ocimene (93%) | Per cent Allo-ocimene | | Drying Rate, hrs. | |
|---|---|---|---|---|---|
| | | Total Enamel | Total Solvent | Set to Touch | Set to Dust |
| 11 | 0 | 0 | 0 | 1.5 | 3 |
| 5.5 | 5.5 | 5 | 9.0 | 1 | 1.75 |
| 0 | 11 | 10 | 18.0 | 1 | 1.75 |

*Example 9*

One hundred parts of the enamel prepared as described in Example 8 were diluted as described in that example except that myrcene was used in place of allo-ocimene. The decrease in the drying rate of the enamel due to the effect of the myrcene is shown in the following tabulation:

| Parts of Above Mixed Solvent | Parts Myrcene | Per cent Myrcene | | Drying Rate hrs. | |
|---|---|---|---|---|---|
| | | Total Enamel | Total Solvent | Set to Touch | Set to Dust |
| 11 | 0 | 0 | 0 | 1.5 | 3 |
| 5.5 | 5.5 | 5 | 9 | 1.25 | 2.5 |
| | 11 | 10 | 18 | 1.25 | 2.5 |

The examples have illustrated the use of both myrcene and allo-ocimene as solvents in protective coating compositions containing an oleaginous film-forming ingredients. Actually, any acyclic terpene of the empirical formula $C_{10}H_{16}$, having three double bonds per molecule can be employed. Thus, ocimene may also be employed. Allo-ocimene gives the best results and is accordingly preferred. This may be due to the peculiar structure of the acyclic terpene which in addition to having three double bonds has them in a triply conjugated system. Hereinafter, an acyclic terpene, having three double bonds per molecule, will be referred to for convenience merely as an acyclic terpene.

The acyclic terpene utilized in accordance with the invention may be prepared by any of the methods known in the art. Thus, for example, allo-ocimene may be prepared by the isomerization of ocimene, as described in "Terpenes" by Simonsen, vol. I, page 14. It may also be prepared by the catalytic isomerization of alpha-pinene using reduced copper, copper chromite, cobalt-thorium, etc., as catalysts, or by simple heat isomerization at temperatures of from 300° C. to 550° C. Myrcene, for example, may be prepared by heat isomerization of beta-pinene at, say, 400° C.

As indicated by the examples, the acyclic terpene may be employed in substantially pure form or it may be employed in impure form, as for example, in the form of pyrolyzates resulting from the heat or catalytic isomerization of various raw materials. As an illustration, the heat isomerization of alpha-pinene will yield impure terpene mixtures containing up to about 45% allo-ocimene, depending on the particular conditions. The heat isomerization of beta-pinene will yield impure terpene mixtures containing up to about 70% myrcene, depending on the particular conditions. The pure acyclic terpene may be separated from such mixtures, if desired, by any convenient means, as by fractional distillation.

Any of the aforesaid impure acyclic terpene mixtures may be employed. Furthermore, composition solvents containing acyclic terpenes in conjunction with any of the solvents heretofore used in protective coating compositions of the type under consideration may be employed. Thus, aliphatic hydrocarbon solvents such as petroleum ether, gasoline, petroleum spirits, V. M. & P. naphtha, mineral spirits, kerosene, etc.; aromatic hydrocarbon solvents, such as benzene, toluene, xylene, coal tar naphtha, ethyl benzene, o-cymene, m-cymene, p-cymene, etc.; terpene solvents, such as dipentene, alpha-pinene, beta-pinene, wood turpentine, gum turpentine, pine oil, etc.; hydrogenated aliphatic and aromatic hydrocarbons, such as the hydrogenated naphthas, cyclohexane, tetrahydronaphthalene, etc., may be employed. The total solvent emloyed in preparing protective coating compositions in accordance with this invention may contain any desired proportion of acyclic terpene. However, the drying speed of protective coating compositions containing drying oils is speeded up when the solvent contains an amount of acyclic terpene as low as about 10% based on the total solvent. The acyclic terpene may be present as 100% of the total solvent but this quantity of acyclic terpene is not necessary to obtain the maximum drying speed.

The use of an acyclic terpene as a solvent or partial solvent in coating compositions of the type mentioned, as will be apparent from the examples presents certain striking and unusual advantages. Thus, the drying rates of the resulting coating compositions are increased considerably both in reaching the dust-free and tack-free stages. This is very unexpected inasmuch as the boiling point of allo-ocimene; namely, 190-195° C. (760 mm.) is considerably above that of wood turpentine which boils at 150-170° C. and mineral spirits which usually boils at 148° C.-210° C. Hence, the improved drying characteristics of the protective coating films containing acyclic terpenes is clearly not due to boiling point characteristics of the solvent. The use of acyclic terpenes also has the effect of imparting higher solvency power and anti-skinning characteristics to oleaginous protective coatings, as has been illustrated by the examples. Varnishes prepared in accordance with the invention utilizing an acyclic terpene as a solvent are found to have good acid and water resistance, and to be productive of harder varnish films when compared with varnish compositions containing the solvents heretofore used.

Other advantages also result from the use of acyclic terpenes in oleaginous coating compositions. For example, the pigmentation of many varnishes with toluidine red normally inhibits the drying. However, employing an acyclic terpene such as allo-ocimene as the solvent actually accelerates the drying time. Thus, acyclic terpenes have the effect of counteracting a decreased drying rate of specific pigments.

This application is a continuation-in-part of my copending application, Serial No. 425,237, filed December 31, 1941, now abandoned.

What I claim and desire to protect by Letters Patent is:

1. A protective coating composition comprising a drying oil and a solvent, said solvent containing at least about 10% of an acyclic terpene having three double bonds per molecule and an empirical formula of $C_{10}H_{16}$.

2. As a varnish, a composition comprising a drying oil, a resin and a solvent, said solvent containing at least about 10% of an acyclic terpene having three double bonds per molecule and an empirical formula of $C_{10}H_{16}$.

3. As a paint, a composition containing a pigment admixed with a vehicle comprising a drying oil and a solvent, said solvent containing at least about 10% of an acyclic terpene having three double bonds per molecule and an empirical formula of $C_{10}H_{16}$.

4. As an enamel, a composition containing a pigment admixed with a vehicle comprising a drying oil, a resin and a solvent, said solvent containing at least about 10% of an acyclic terpene having three double bonds per molecule and an empirical formula of $C_{10}H_{16}$.

5. As a varnish, a composition comprising a drying oil, a resin and a solvent, said solvent containing at least about 10% of allo-ocimene.

6. As a paint, a composition containing a pigment admixed with a vehicle comprising a drying oil and a solvent, said solvent containing at least about 10% of allo-ocimene.

7. As an enamel, a composition containing a pigment admixed with a vehicle comprising a drying oil, a resin and a solvent, said solvent containing at least about 10% of allo-ocimene.

8. As a varnish, a composition comprising a drying oil, ester gum, and a solvent, said solvent containing at least about 10% of allo-ocimene.

9. As a varnish, a composition comprising a drying oil, a phenol-formaldehyde resin, and a solvent, said solvent containing at least about 10% of allo-ocimene.

10. As a varnish, a composition comprising a drying oil, a resin and a solvent, said solvent containing at least 40% of allo-ocimene.

11. As a paint, a composition containing a pigment admixed with a vehicle comprising a drying oil and a solvent, said solvent containing at least 40% of allo-ocimene.

12. An an enamel, a composition containing a pigment admixed with a vehicle comprising a drying oil, a resin, and a solvent, said solvent containing at least 40% of allo-ocimene.

ALFRED L. RUMMELSBURG.